Patented Sept. 20, 1949

2,482,725

UNITED STATES PATENT OFFICE 2,482,725

PRODUCTION OF VINYL ETHER AND ITS HOMOLOGUES

Peter Lionel Bramwyche, London, and Martin Mugdan, Richmond, England, assignors to The Distillers Company, Limited, Edinburgh, Scotland, a British company No Drawing. Application December 4, 1946, Serial No. 713,922. In Great Britain December 12, 1945

18 Claims. (Cl. 260—614)

The present invention is for improvements in or relating to the production of vinyl ethers and homologues thereof.

It is known that vinyl ethers are produced by the vapour phase thermal dissociation of acetals and that this dissociation is promoted by the use of catalysts. Various catalysts have been proposed for this purpose, all of which are solid materials and, in consequence, they suffer from the usual disadvantage of heterogeneous catalysts, i. e. they transmit heat badly, and they have a restricted useful life.

One object of our present invention is to provide a catalyst or catalysts for the dissociation of acetals in the vapour phase, which are not subject to the above-mentioned difficulties.

According to the present invention there is provided a process for the production of vinyl ethers which comprises subjecting an acetal to thermal dissociation in the presence of the vapour of a volatilisable strong mineral acid, or an anhydride thereof, stable under the reaction conditions, as a catalyst. The catalyst is preferably sulphuric acid, sulphur trioxide or the hydrogen halides and may be generated in the case of the catalyst containing the $SO_3$ radical, in situ for example from alkyl sulphuric esters, e. g. ethyl sulphuric acid and diethyl sulphate and most advantageously from di-isopropyl sulphate or from other compounds whether of an organic or inorganic nature which are decomposable at or below the reaction temperature to yield the said stable vapours; the reaction products between the strong mineral acids and acetals which are capable of yielding the gaseous acid on decomposition also act as catalysts for the reaction.

The catalysts may be employed in conjunction with the acetals by either dissolving them in the acetals, vaporising them together and passing the mixture through the heated reaction zone, or by introducing the vaporisable catalyst and the acetal separately into the reaction zone. We prefer this last method as it avoids any undesirable reaction between the catalytic substance and the liquid acetals.

The quantities of catalyst used in carrying out the process according to our invention may vary within very wide limits. We have found that in some cases 0.1 mol percent, calculated on the acetal, gives excellent results, whilst in others 1.5 mol percent and more may need to be used to furnish good results.

We have observed that under the influence of the acid catalyst the dissociation product, on leaving the reaction zone and cooling, may be recombined in part into the original acetals and it is a feature of the invention that this recombination is diminished or prevented by the introduction of nitrogen-containing bases, such as ammonia, alkyl amines, pyridines and the like, to the reactants or to the reaction products. These inhibitors may be added to the reaction products immediately they leave the reaction zone or they may be added in conjunction with the acid catalysts in admixture with the acetals before entering the reaction zone. In the latter case, the inhibitors may be used in the form, for instance, of ammonium or pyridine salts of the acid serving as catalyst so that in the reaction zone the salts decompose to yield both the catalyst and the inhibitor. The quantities of inhibitors used will depend upon the quantities of acid catalyst used for the dissociation reaction.

The following tables serve to illustrate the process according to our invention by a number of experiments, but the scope of our invention is not to be regarded as limited thereby except as indicated in the appended claims. The tables show the effects of acid catalysts at different temperatures compared with the results obtained by heating the acetals in the absence of such catalytic substances, and also shows the effect of the addition of substances serving as recombination inhibitors. The experiments were carried out, in every case, by feeding the respective acetal at a rate of 0.3 mol./hr. into a glass tube of an internal diameter of 11 mm., and heated over a length of 65 cm. The tube was constricted at the exit end to reduce the time of passage of the exit gases from the hot reaction zone to the receiver in which some pyridine dissolved in acetal was present from the start. The receiver was cooled to about —70° C. The tables further give the amount, if any, of recombination inhibitor used. If added after passing the reaction zone, it was introduced immediately before the constricted end of the reaction tube by means of an inner tube of narrow bore coaxial with the reaction tube.

Table I.—*Conversion of diethyl acetal to ethylvinyl ether*

| Experiment | Temp., °C. | Catalyst in mol Percent | Inhibitor in mol Percent | Percent Conversion |
|---|---|---|---|---|
| 1 | 350 | 0.5% sulphuric acid. | 4% gaseous ammonia. | 65 |
| 2 | 350 | No catalyst. | No inhibitor. | 8 |
| 3 | 350 | 0.1% Ethyl sulphuric acid. | 1% gaseous ammonia. | 67 |
| 4 | 350 | 1% Diethyl sulphate. | 3% pyridine. | 62 |
| 5 | 350 | 1% Diethyl sulphate. | No inhibitor. | 43 |
| 6 | 350 | 1.5% SO₃ vapour. | ----do---------- | 35 |
| 7 | 350 | 1.5% SO₃ vapour. | 5% pyridine. | 59 |
| 8 | 253 | 0.1% ethyl sulphuric acid. | 1% pyridine. | 9 |
| 9 | 253 | No catalyst. | ----do---------- | 2 |
| 10 | 253 | 1% SO₃ vapour. | 5% pyridine. | 18 |
| 11 | 350 | 1% hydrogen chloride. | 4% gaseous ammonia. | 16 |

The catalyst was added to the acetal feed in experiments 1, 3, 4, 5, 8 and 11 and was introduced separately into the reaction zone in experiments 6, 7 and 10. The recombination inhibitor was fed in at the end of the reaction zone in experiments 1, 3 and 11 and was added to the acetal feed in experiments 4, 7, 8, 9 and 10.

Table II.—*Conversion of dimethyl acetal to methylvinyl ether*

| Experiment | Temp., °C. | Catalyst in mol Percent | Inhibitor in mol Percent | Percent Conversion |
|---|---|---|---|---|
| 1 | 350 | 0.1% ethyl sulphuric acid. | 1% gaseous ammonia. | 17 |
| 2 | 400 | ----do---------- | ----do---------- | 30 |
| 3 | 400 | No catalyst. | ----do---------- | 14 |

The catalyst was added to the acetal feed in experiments 1 and 2 and the recombination inhibitor was in each case fed in at the end of the reaction zone.

We have found that di-isopropyl sulphate is a particularly satisfactory sulphuric ester to employ as it produces improved results as compared with the other materials mentioned above.

The improved results obtainable are probably due to the fact that di-isopropyl sulphate is more readily decomposable at the reaction temperature and therefore produces a larger quantity of sulphuric acid vapour than the corresponding amounts of the sulphates of the normal ethyl or propyl alcohols while at the same time its decomposition at the temperature at which vapourisation of the mixture takes place in the reaction tube is negligible.

In illustration of the advantage of the use of di-isopropyl sulphate as a catalyst we give the following example quoting the results of two comparative experiments in which the process was carried out as described in Experiment 4 of Table I using, in Experiment A, 0.1 mol percent of di-isopropyl sulphate and, in Experiment B, 0.1 mol percent of diethyl sulphate in place of the 1 mol percent of diethyl sulphate, the conditions being otherwise exactly the same. In Experiment A utilising the di-isopropyl sulphate, the conversion figure was 33% whereas the conversion figure was only 24% in Experiment B with the diethylsulphate catalyst.

It will be seen that the di-isopropyl sulphate catalyst was very much more active than the other catalysts listed in Table I.

Although the invention has been described with reference to dimethyl acetal and diethyl acetal it is not to be regarded as limited thereto but is applicable to other acetals, for example, acetone acetal which is convertible to methyl-α-methylvinyl ether.

Reduced pressure or dilution by inert gases or vapours may be used in the process according to our invention in order to promote dissociation of the reaction components. It is also possible to employ the gaseous catalysts according to our invention in conjunction with known catalysts of a solid nature such as fire clay.

What we claim is:

1. A process for the production of a vinyl ether which comprises subjecting an acetal to thermal dissociation in the presence of vapour of a strong mineral acid as catalyst selected from the group consisting of sulphuric acid, sulphur trioxide and the hydrogen halides.

2. A process in accordance with claim 1 in which said vapour is produced in situ by the decomposition of a compound yielding said acid vapour under the reaction conditions.

3. A process in accordance with claim 1 in which said sulphuric acid vapour is generated by the decomposition of an alkyl sulphate.

4. A process in accordance with claim 1 in which said sulphuric acid vapour is generated by the decomposition of di-isopropyl sulphate.

5. A process for the production of a vinyl ether which comprises subjecting an acetal to thermal dissociation in the presence of vapour of a strong mineral acid as catalyst selected from the group consisting of sulphuric acid, sulphur trioxide and the hydrogen halides, said catalyst being present in the proportion from about 0.1 to about 1.5 molar per cent of the acetal.

6. A process for the production of a vinyl ether which comprises subjecting an acetal to thermal dissociation in the presence of vapour of a strong mineral acid as catalyst selected from the group consisting of sulphuric acid, sulphur trioxide and the hydrogen halides, and in the presence of a recombination inhibitor.

7. A process in accordance with claim 6 in which said recombination inhibitor is a nitrogen-containing base.

8. A process for the production of a vinyl ether which comprises subjecting an acetal to thermal dissociation in the presence of vapour of a strong mineral acid as catalyst selected from the group consisting of sulphuric acid, sulphur trioxide and the hydrogen halides, and in the presence of a salt of a nitrogenous base and one of said mineral acids, as an inhibitor.

9. A process for the production of a vinyl ether which comprises subjecting an acetal to thermal dissociation in the presence of vapour of a strong mineral acid as catalyst selected from the group consisting of sulphuric acid, sulphur trioxide and the hydrogen halides, and in the presence of ammonia as an inhibitor of recombination.

10. A process for the production of a vinyl ether which comprises subjecting an acetal to thermal dissociation in the presence of vapour of a strong mineral acid as catalyst selected from the group consisting of sulphuric acid, sulphur trioxide and the hydrogen halides, and in the presence of pyridine as an inhibitor of recombination.

11. A process for the production of a vinyl ether which comprises heating an acetal to a temperature of about 250° to about 400° C. in the presence of sulphuric acid vapour and gaseous ammonia.

12. A process for the production of a vinyl ether which comprises heating an acetal to a temperature of about 250° to about 400° C. in the presence of hydrochloric acid vapour and gaseous ammonia.

13. A process for the production of a vinyl ether which comprises heating an acetal to a temperature of about 250° to about 400° C. in the presence of an alkyl sulphate vapour and gaseous pyridine.

14. A process for the production of a vinyl ether which comprises heating an acetal to a temperature of about 250° to about 400° C. with about 0.1 to 1.5 mols per 100 mols of the acetal of di-isopropyl sulphate and with pyridine.

15. A process for the production of a vinyl ether which comprises subjecting an acetal of a straight chain alcohol to thermal dissociation at a temperature of about 250° C. to about 400° C. in the presence of vapour of a strong mineral acid as catalyst selected from the group consisting of sulphuric acid, sulphur trioxide and the hydrogen halides.

16. A process for the production of a vinyl ether which comprises subjecting an acetal of a straight chain alcohol to thermal dissociation at a temperature of about 250° C. to about 400° C. in the presence of vapour of a strong mineral acid as catalyst selected from the group consisting of sulphuric acid, sulphur trioxide and the hydrogen halides, and in the presence of a recombination inhibitor.

17. A process for the production of a vinyl ether which comprises subjecting diethyl acetal to thermal dissociation in the presence of vapour of a strong mineral acid as catalyst, said catalyst being present in the proportion of 0.1 molar per cent to about 1.5 molar per cent based on the weight of said acetal and said catalyst being selected from the group consisting of sulphuric acid, sulphur trioxide and the hydrogen halides at a temperature of the order of 350° C.

18. A process for the production of a vinyl ether which comprises subjecting dimethyl acetal to thermal dissociation in the presence of vapour of a strong mineral acid as catalyst, said catalyst being present in the proportion of 0.1 molar per cent to about 1.5 molar per cent based on the weight of said acetal and said catalyst being selected from the group consisting of sulphuric acid, sulphur trioxide and the hydrogen halides at a temperature of about 350° C. to about 400° C.

PETER LIONEL BRAMWYCHE.
MARTIN MUGDAN.

REFERENCES CITED

The following references are of record in the file of this patent:

UNITED STATES PATENTS

| Number | Name | Date |
|---|---|---|
| 1,902,169 | Herrmann et al. | Mar. 21, 1933 |
| 2,415,878 | Hale | Feb. 18, 1947 |

FOREIGN PATENTS

| Number | Country | Date |
|---|---|---|
| 710,602 | France | June 9, 1931 |